United States Patent [19]
Knappe et al.

[11] Patent Number: 4,588,313
[45] Date of Patent: May 13, 1986

[54] FOUR-POINT CONTACT BEARING

[75] Inventors: Bernhard Knappe, Obereurheim; Erwin Gerber, Untereuerheim, both of Fed. Rep. of Germany

[73] Assignee: FAG Kugelfischer Georg Schafer KGaA, Fed. Rep. of Germany

[21] Appl. No.: 571,560

[22] Filed: Jan. 17, 1984

[30] Foreign Application Priority Data

Feb. 19, 1982 [DE] Fed. Rep. of Germany ....... 3305768

[51] Int. Cl.$^4$ .............................................. F16C 33/51
[52] U.S. Cl. .................................. 384/604; 384/520
[58] Field of Search ............... 384/604, 615, 614, 612, 384/515, 521, 520

[56] References Cited

U.S. PATENT DOCUMENTS

| 3,061,389 | 10/1962 | Bargmann | 384/615 |
| 3,220,785 | 11/1965 | Noll et al. | 384/604 |
| 4,398,778 | 8/1983 | Kraus | 384/615 |
| 4,400,042 | 8/1983 | Fritz | 384/615 |

Primary Examiner—Lenard A. Footland
Attorney, Agent, or Firm—Ostrolenk, Faber, Gerb & Soffen

[57] ABSTRACT

A four-point contact bearing with the largest possible pressure angles and suitable for rotary and swinging movements is disclosed. The rim gaps on both sides of the balls are extremely narrow and offset radially with respect to each other. The cage is segmented and the segments have guide straps which are also offset with respect to each other and extend into the rim gaps.

10 Claims, 6 Drawing Figures

FOUR-POINT CONTACT BEARING

BACKGROUND OF THE INVENTION

1. Field of the Invention

The invention relates to a four-point contact bearing which includes balls, ball races and cage segments.

2. Description of the Prior Art

Four-point contact bearings including balls held apart by a cage or other structure have been used for many years. For example, there are swivel bearings, in which the balls are held apart by so-called intermediate pieces. Rim slots, used in some other bearings, are not used in these swivel bearings, in order that the bearing rings have high shoulders and the raceways may have large pressure angles. Large axial forces and tilting moments may be transmitted through the bearing, but the different ball speeds resulting therefrom are not taken up by the intermediate pieces, so that circumferential forces result which brake the balls against the intermediate pieces. The braked or decelerated balls slide on the raceways, increasing wear. Furthermore, the decelerated balls produce a pile-up of balls, so that the circumferential braking force increases further. This accumulation of circumferential forces results in a "bottle-neck effect", causing the bearing moment of rotation to vary greatly. The use of a four-point contact bearing with such intermediate pieces is therefore limited to swinging movements with small angles of swing, since bottleneck effects can begin to occur upon swinging movements of more than 180°.

Furthermore, the intermediate pieces used in such bearings have a shape which makes them difficult to form as an injection molded part, so that they tend to break due to the internal stresses and forces which occur in operation. Intermediate pieces are therefore for the most part cut from semifinished articles, which is a very expensive and cumbersome process.

In order to avoid these disadvantages, it is possible to use a four-point contact bearing with a cage for the balls. The cage is shaped like a ring or is comprised of a plurality of ring segments, which are disposed together to form a cage ring. The cage has a relatively large cross-section for stability and is guided in the rim gaps between the rings. Each cage segment may, for instance, cover more than one ball, so that the segment is held by the balls and cannot twist. As a result of the relatively large width of the rim gap required for the cage, the travel grooves or raceways for the balls are reduced in size. Therefore, large pressure angles for the transmission of predominantly axial loads are not possible in the races. For this reason, such a bearing design is limited to use in predominantly radially loaded four-point contact bearings.

SUMMARY OF THE INVENTION

The primary object of the present invention is therefore to provide a four-point contact bearing of the aforementioned type which is suitable for rotary movements but which avoids bottleneck effects and is also suitable for large pressure angles. The bearing of the invention can therefore be used in applications with predominantly axial loads.

This and other objects are achieved by providing an extremely narrow rim gap between the inner and outer races on each side of the balls. The rim gaps are also offset radially from each other measured from the axis of the bearing. The balls are separated by cage segments. The cage segment around each ball includes guide straps extending into the rim gaps, which are radially offset to a similar extent as the rim gaps.

Because the rim gaps are narrow and are offset from each other, a large pressure angle can be maintained, at least in one direction. As a result, the bearing can transmit large, predominantly axial forces, as well as tilting moments. The new cage segments in such a four-point contact bearing provide important advantages for every use in which predominantly axial forces occur, regardless of whether the bearing rotates rapidly or whether mere swinging movements take place. The cage segments, unlike the intermediate pieces of the prior art, can be injection molded without internal stresses. The cage segments contact each other and hold the balls apart in the circumferential direction, so that the balls can turn freely in their cage segment pockets even when circumferential forces occur due to leading or lagging of the balls. Sliding movement of the balls on the races is thereby prevented. High bearing temperatures do not occur since constraining forces are avoided. Since the bearing is suitable both for rotating and swinging movements, it can be used universally, in place of the two separate types of bearings heretofore required, which doubled manufacture and stocking costs.

In accordance with a preferred embodiment, each cage segment surrounds only one ball and has a flat rectangular shape. The cage segment has two guide straps, one extending into each rim gap. Each guide strap has a narrow, straight part which extends generally tangentially of the raceway and has widened or bead-like ends which are nearly as wide, measured radially of the bearing, as the rim gaps. This segment construction makes it possible to use the same cage segments for bearings of different diameter but of the same rim gap width. In this way, manufacture and stocking of bearings and parts are further facilitated. The flat shape of the cage segments furthermore produces a damping effect in the circumferential direction.

In order to prevent the cage segments from turning in the bearing, an offset is provided on at least one side of each segment, abutting a rim where it meets the raceway. In order to strengthen the cage segments, in accordance with another embodiment of the invention, each segment can have a yoke with the shape of half of a ring which extends into a groove in the race and guides the segment.

Other objects, features and advantages of the invention will be apparent from the following description, considered together with the accompanying drawings and the appended claims.

DETAILED DESCRIPTION OF THE PREFERRED EMBODIMENTS

Figure 1:
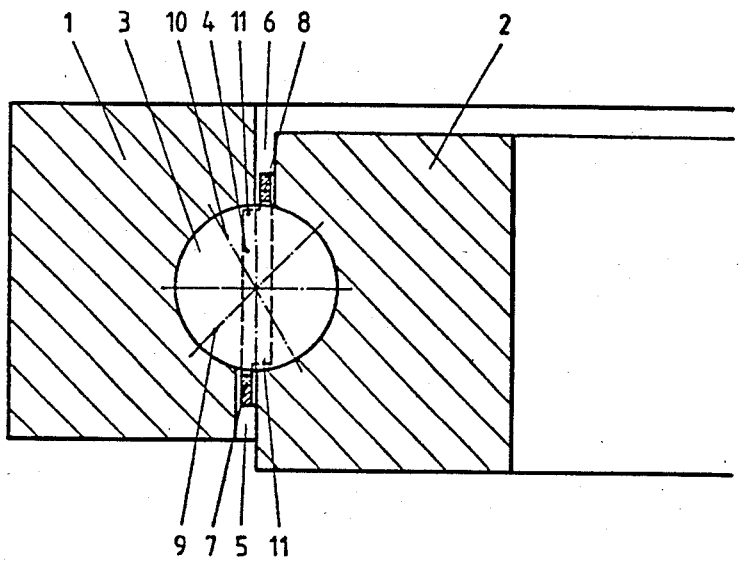
FIG. 1 is a transverse section through a four-point contact bearing according to the invention.

Referring to FIG. 1, a four-point contact bearing according to the invention comprises the outer race ring 1, the inner race ring 2, the balls 3 and the cage segments 4. Outer ring 1 and inner ring 2 each have a respective annular raceway with a generally semicircular, concave cross-section and between two axially opposite rims. The raceways and rims all have their centers on the bearing axis. The rings and the rims are shaped and are on bearing radii such that when the inner ring 2 is mounted in the outer ring 1, rim gaps 5, 6 are defined between the facing circular rims of the rings, and a toroidal raceway for ball 3 is defined by the facing raceways. The rim gaps 5 and 6 between the rings 1 and 2 are very narrow, having a width, measured radially of the bearing which, in one embodiment, equals about one twenty-fourth (1/24) of the circumference or 15 degrees of arc of the circular cross-section of the toroidal raceway. Rim gaps 5 and 6 are also radially offset from each other because the circular rims of the outer ring 1 and inner ring 2 are each radially offset from the bearing axis with respect to each other, as shown. The gap 5 is radially further out from the axis.

The cage segments 4 have guide straps 7 and 8 which are also offset with respect to each other. The offset rim gaps 5 and 6 result in different rim heights at the sides of the raceway, measured radially from the bearing axis, whereby different pressure angles 9 and 10 can be maintained. As shown in FIG. 1, the diameter of the ball parallel to each such angle will intersect both outer ring 1 and inner ring 2, and the force will accordingly be transmitted from one ring to the other without damage to the bearing. The four-point contact bearing can therefore be loaded predominantly axially of the bearing and, in addition, can take tilting forces and radial forces.

In order that the segments 4 will be retained in the desired positions within the bearing at all times, they have radially offset portions 11 in the contact pieces and adjacent to the guide straps. Each portion is radially offset from the adjacent guide strap so that it abuts the inner or outer raceway at one of the inward-facing opposite shoulders where the rim gaps 5, 6 meet the raceways. These offset portions 11 therefore guide the segment 4 along the shoulders.

Figure 2:
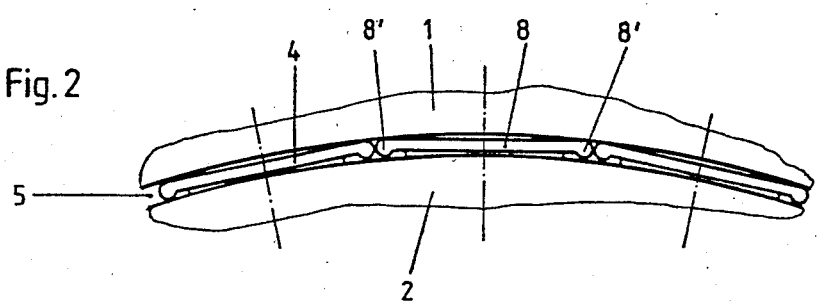
FIG. 2 is a side view of the bearing of FIG. 1, showing the rim gap.

FIG. 2 shows a portion of FIG. 1 in axial view. The bead-like ends 7' and 8' on the cage segments 4 nearly fill the radial space between the rings 1 and 2 in the rim gap 5, as can be seen in FIG. 2. The ends 7' and 8' extend out of segments 4 and the narrow parts of guide straps 7, 8 extending between ends 7', 8' are radially narrower than the rim gap. As can be seen in FIG. 2, these narrow parts do not follow the curvature of the outer rim, but, because they are straight, lie inward slightly toward the axis of the bearing. As a result, one segment size can be used with rim gaps of different diameters without taking into account the different curvature of the rim gaps.

Figure 3A:
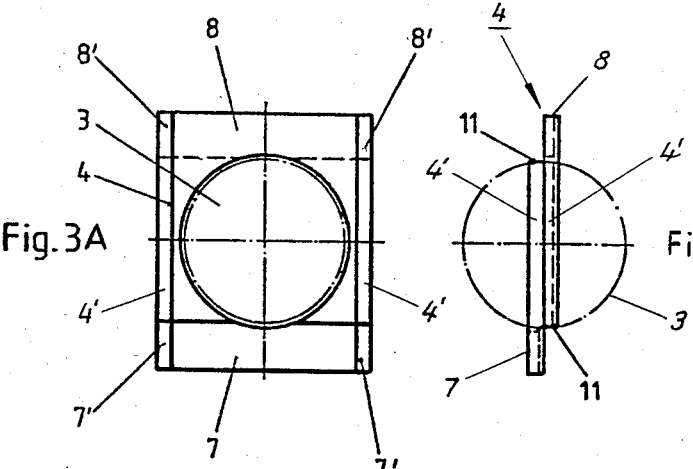
FIGS. 3A, B and C, respective, show a cage segment of the bearing of FIG. 1 in plan, transverse and longitudinal views.
Figure 3B:
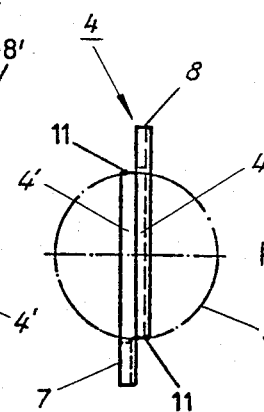
Figure 3C:
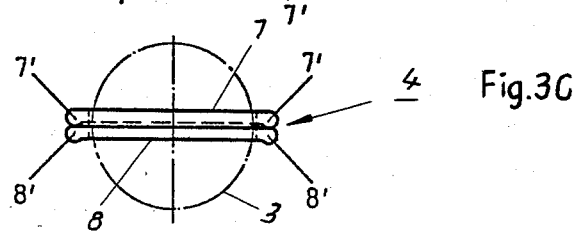

Details of the shape of the segments 4 can be seen in FIG. 3. FIG. 3A shows cage segment 4 around ball 3 as viewed along a radius of the bearing. Cage segment 4 has a generally flat rectangular shape, as shown, and fits around ball 3, with guide straps 7, 8 on two opposite axial sides joined by contact pieces 4', which form the other pair of opposite circumferential sides of cage segment 4. As can be seen by comparing FIG. 3A with FIG. 2, circumferential contact pieces 4' of each segment contact the contact pieces 4' of adjacent cage segments 4 to hold balls 3 apart. Each end of each guide strap 7, 8 is a radially widened or bead-like end 7', 8' as was shown in FIG. 2. Offset portions 11 at the ends of contact pieces 4' of the cage segment adjacent guide straps 7, 8 can be seen clearly in FIG. 3B, which shows cage segment 4 from the same perspective as FIG. 1. As shown in FIG. 1, offset portions 1 meet the axially inward-facing shoulders where the raceways meet rim gaps 5, 6. FIG. 3C, which shows cage segment 4 from the same perspective as FIG. 2, shows how guide straps 7 and 8 and their bead-like ends 7', 8' are offset radially from each other.

Figure 4:
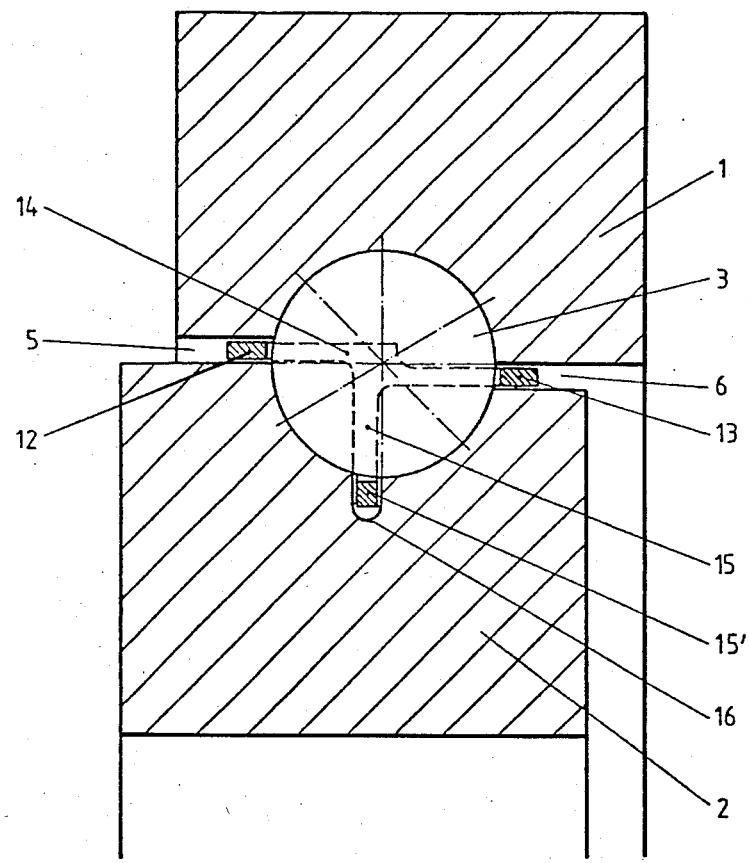
FIG. 4 shows a transverse section through an alternative embodiment to that of FIG. 1.

FIG. 4 shows an alternative embodiment. Here rim gaps 5 and 6 between rings 1 and 2 are offset as in FIG. 1. The guide straps 12 and 13 of the segments 14 extend into rim gaps 5 and 6. Of particular importance here is the yoke 15 of the segment 14, whose curved ring part 15' extends into an annular radially inwardly projecting groove 16 in the raceway of the inner ring 2. In this way, the stability of the segments 14 is increased and they are protected against twisting.

Although the present invention has been described in connection with a plurality of preferred embodiments thereof, many other variations and modifications will now become apparent to those skilled in the art. It is preferred, therefore, that the present invention be limited not by the specific disclosure herein, but only by the appended claims.

What is claimed is:

1. A four-point contact bearing comprising:
   an outer race ring with an inner surface and an inner race ring inside the outer ring and having an outer surface, the inner and outer surfaces facing each other and each defining a respective inner and outer ball raceway, a first annular rim gap defined by and between the inner and the outer surfaces of the inner and the outer rings and adjoining a first axial side of the ball raceways and a second annular rim gap defined by and between the inner and the outer surfaces of the inner and the outer rings and adjoining a second axial side of the ball raceways opposite the first side; the ball raceways and the first and second annular rim gaps all having centers lying on the axis of the bearing; at the first annular rim gap the inner and the outer surfaces of the inner and the outer rings having respective radii measured from the bearing axis that are greater than the respective radii of the inner and outer rings at the second annular rim gap measured from the bearing axis;
   a plurality of bearings rollably mounted in the ball raceways; and
   a cage for the balls comprising a plurality of cage segments for holding the balls apart, each cage segment comprising first and second guide elements extending into the first and second rim gaps, respectively; the first guide element thereby being positioned at a greater radius measured from the bearing axis than the radius at which the second guide strap is positioned.

2. The bearing of claim 1 in which each cage segment is mounted around a respective one of the balls.

3. The bearing of claim 2 in which each cage segment is generally flat and is sized for fitting around the respective ball, the first and second guide elements defining a first pair of opposite sides of the cage segment, each cage segment further comprising first and second contact pieces joining the first and second guide elements, placed for contacting adjacent cage segments.

4. The bearing of claim 3 in which each cage segment has at least one portion on at least one of the first and second contact pieces, which portion is radially offset from and adjacent to a respective one of the guide elements; each of the inner and outer raceways defining first and second generally axially inward-facing opposite shoulders where each raceway joins the first and second annular rim gaps, respectively; each radially offset portion abutting at least one of the shoulders for retaining the cage segment in position.

5. The bearing of claim 4 in which the cage segment has two axially opposite ones of the radially offset portions, a first one of the offset portions abutting one of the first inward-facing shoulders and a second one of the offset portions abutting one of the second inward-facing shoulders.

6. The bearing of claim 5 in which the abutted first inward-facing shoulder is defined by the inner raceway and the abutted second inward-facing shoulder is defined by the outer raceway.

7. The bearing of claim 3 in which each guide strap has two opposite circumferential ends and an extended radially narrow part connecting the ends, each end being radially nearly as wide as the respective rim gap, for stabilizing the guide element in the rim gap.

8. The bearing of claim 7 in which the extended narrow part of each guide element of each cage segment is straight and uncurved and has a radial width narrower than the rim gap.

9. The bearing of claim 3 in which each cage segment is of generally rectangular shape with the elements defining two of the sides and the contact pieces defining the other two sides.

10. The bearing of claim 1, wherein the first and second rim gaps are radially very narrow.

* * * * *